(12) United States Patent
Fauteux et al.

(10) Patent No.: US 11,165,126 B2
(45) Date of Patent: **\*Nov. 2, 2021**

(54) BATTERY POUCH, BATTERY CELL AND METHOD OF MAKING A POUCH OR BATTERY CELL

(71) Applicant: TECHTRONIC CORDLESS GP, Anderson, SC (US)

(72) Inventors: Denis Gaston Fauteux, Tsuen Wan (HK); Wing Keung Woo, Tsuen Wan (HK)

(73) Assignee: TECHTRONIC CORDLESS GP, Anderson, SC (US)

( * ) Notice: Subject to any disclaimer, the term of this patent is extended or adjusted under 35 U.S.C. 154(b) by 66 days.

This patent is subject to a terminal disclaimer.

(21) Appl. No.: 16/538,483

(22) Filed: Aug. 12, 2019

(65) Prior Publication Data
US 2019/0363332 A1 Nov. 28, 2019

Related U.S. Application Data

(63) Continuation of application No. 15/502,602, filed as application No. PCT/CN2015/086488 on Aug. 10, 2015, now Pat. No. 10,381,065.

(30) Foreign Application Priority Data

Aug. 8, 2014 (HK) .................................. 14108177.2

(51) Int. Cl.
*H01M 50/543* (2021.01)
*H01M 10/0525* (2010.01)
(Continued)

(52) U.S. Cl.
CPC ............. *H01M 50/543* (2021.01); *B25F 5/02* (2013.01); *H01M 10/052* (2013.01);
(Continued)

(58) Field of Classification Search
CPC ............. H01M 50/543; H01M 50/531; H01M 50/124; H01M 50/209; H01M 50/116;
(Continued)

(56) References Cited

U.S. PATENT DOCUMENTS

| 5,312,851 A | 5/1994 | Matsuki et al. |
| 10,381,605 B2 * | 8/2019 | Fauteux .............. H01M 10/052 |

(Continued)

FOREIGN PATENT DOCUMENTS

| CN | 201069792 | 6/2008 |
| CN | 106356494 A | 1/2017 |

(Continued)

OTHER PUBLICATIONS

European Patent Office Examination Report for Application No. 15830550.8 dated Jul. 31, 2020 (4 pages).

(Continued)

*Primary Examiner* — Olatunji A Godo
(74) *Attorney, Agent, or Firm* — Michael Best & Friedrich LLP (57) ABSTRACT

A pouch-type battery comprising: a pouch-type battery case having a joined wall and a cell space within the pouch, a battery cell within the cell space, a terminal tab extending outwardly of the cell space from the battery cell, said joined wall comprising at least a first sealing portion having a first sealing strength, and a second sealing portion having a second sealing strength that is less than the first sealing strength such that the second sealing portion is adapted to fail before said first sealing portion, and an electrical contact located with the second sealing portion and adapted to change contact state upon failure of the second sealing portion.

20 Claims, 9 Drawing Sheets

(51) Int. Cl.
  *H01M 10/058* (2010.01)
  *H01M 10/42* (2006.01)
  *H02K 11/30* (2016.01)
  *B25F 5/02* (2006.01)
  *H01M 10/052* (2010.01)
  *H01M 10/48* (2006.01)
  *H02K 7/14* (2006.01)
  *H02K 11/00* (2016.01)
  *H01M 50/116* (2021.01)
  *H01M 50/124* (2021.01)
  *H01M 50/172* (2021.01)
  *H01M 50/209* (2021.01)
  *H01M 50/342* (2021.01)
  *H01M 50/531* (2021.01)
  *H01M 50/557* (2021.01)
  *H01M 50/572* (2021.01)
  *B25B 21/00* (2006.01)

(52) U.S. Cl.
  CPC ..... *H01M 10/058* (2013.01); *H01M 10/0525* (2013.01); *H01M 10/425* (2013.01); *H01M 10/486* (2013.01); *H01M 50/116* (2021.01); *H01M 50/124* (2021.01); *H01M 50/172* (2021.01); *H01M 50/209* (2021.01); *H01M 50/342* (2021.01); *H01M 50/531* (2021.01); *H01M 50/557* (2021.01); *H01M 50/572* (2021.01); *H02K 7/145* (2013.01); *H02K 11/0094* (2013.01); *H02K 11/30* (2016.01); *B25B 21/00* (2013.01); *H01M 2200/00* (2013.01); *H01M 2220/30* (2013.01)

(58) Field of Classification Search
  CPC ........... H01M 10/052; H01M 10/0525; H01M 10/058; H01M 10/425
  See application file for complete search history.

(56) References Cited

U.S. PATENT DOCUMENTS

| | | |
|---|---|---|
| 2001/0038938 A1 | 11/2001 | Takahashi |
| 2005/0077878 A1* | 4/2005 | Carrier ................ H01M 10/441 |
| | | 320/134 |
| 2009/0246607 A1 | 10/2009 | Shinyashiki et al. |
| 2010/0291423 A1 | 11/2010 | Hideo et al. |
| 2011/0097630 A1 | 4/2011 | Choi et al. |
| 2011/0104520 A1 | 5/2011 | Ahn |
| 2013/0115487 A1* | 5/2013 | Park ..................... H01M 2/0212 |
| | | 429/56 |
| 2013/0143077 A1 | 6/2013 | Yebka et al. |
| 2017/0229682 A1 | 8/2017 | Fauteux et al. |

FOREIGN PATENT DOCUMENTS

| | | | |
|---|---|---|---|
| CN | 205992572 U | | 3/2017 |
| JP | 2000067846 | | 3/2000 |
| WO | WO2013005922 | * | 1/2013 |

OTHER PUBLICATIONS

International Preliminary Report on Patentability for Application No. PCT/CN2015/086488 dated Feb. 14, 2017 (6 pages).
International Search Report and Written Opinion for Application No. PCT/CN2015/086488 dated Oct. 27, 2015 (8 pages.
European Patent office Search Report for Application No. 15830550.8 dated Dec. 5, 2017, 9 pages.
Australian Patent Office Examination Report No. 1 for Application No. 2015299442 dated Dec. 20, 2017, 3 pages.
Office Action issued by the Chinese Patent Office for Application No. 201820278528.9 dated Aug. 10, 2018 (3 pages including statement of relevance).
Office Action issued by the Chinese Patent Office for Application No. 201820278528.9 dated Dec. 5, 2018 (3 pages including statement of relevance).

* cited by examiner

BATTERY POUCH, BATTERY CELL AND METHOD OF MAKING A POUCH OR BATTERY CELL

RELATED APPLICATIONS

The present application is a continuation of U.S. patent application Ser. No. 15/502,602, filed Feb. 8, 2017, which is the U.S. national stage application of PCT Application No. PCT/CN2015/086488, filed Aug. 10, 2015, which claims priority to Hong Kong Patent Application No. HK14108177.2, filed Aug. 8, 2014, the entire contents of all of which are hereby incorporated by reference.

FIELD OF THE INVENTION

The present invention relates to pouch-type lithium ion or lithium-polymer battery cells, and to pouch type lithium ion or lithium-polymer battery packs for use in portable power tools, including tools, garden tools and home appliances. The invention also relates to a method of making a pouch-type battery cell to include a current interrupting mechanism. In particular, the invention relates to a pouch-type lithium ion or lithium-polymer cell and battery pack suitable for powering a hand held cordless power tool.

BACKGROUND TO THE INVENTION

Pouch-type lithium ion and lithium-polymer battery cells offer efficient way to design and produce high capacity and low resistance power capable to deliver high power with minimum heat generation However, the absence of a hard case containment make its difficult to control, swelling, bulging and venting of the pouch due to gas generation during charge and discharge, a concern with pouch-type cells. This invention provides a mean add a CID to pouch-type lithium ion power cell.

SUMMARY OF THE INVENTION

The present invention provides a pouch-type lithium ion or lithium-polymer battery cell and battery pack a method/means for a battery, tool or charger to determine when a pouch-type lithium ion battery cell/pack internal pressure has increase and anticipate venting and provide a mean to disconnect the cell from external load/supply as to interrupt charge/discharge of the cell/pack.

The pouch walls are sealed so that one portion of the seal is weaker than other portions and will fail first. An electrical contact is provided with the weaker seal portion. Preferably, although not exclusively, the electrical contact has an electrical resistance of less than, say, 10-ohms. If the pouch internal pressure increases, prior to venting the resistance of the electrical contact is interrupted or at least increased. If the resistance between the contact and terminal increases to over, say, 20-ohms then electronic control in the pack and/or the charger and/or the tool determines that there is a possible pressure increase and will interrupt the charge/discharge prior to venting of the cell pouch. The electrical contact may include one of the cell terminals.

On one particular aspect of the invention there is provided a pouch-type battery comprises a pouch-type battery case having a joined wall and a cell space within the pouch, a battery cell within the cell space, a terminal tab extending outwardly of the cell space from the battery cell, said joined wall comprising at least a first sealing portion having a first sealing strength, and a second sealing portion having a second sealing strength that is less than the first sealing strength such that the second sealing portion is adapted to fail before said first sealing portion, and an electrical contact located with the second sealing portion and adapted to change contact state upon failure of the second sealing portion.

Preferably, although not exclusively, the second sealing portion seals the pouch-type battery case and the terminal tab, the terminal tab forming at least one part of the electrical contact.

Preferably, the electrical contact comprises a contact tab in electrical contact with the terminal tab, the contact tab adapted to separate from the terminal tab upon failure of the second sealing portion.

Preferably, the terminal tab comprises one of an anode lead or a cathode lead, and wherein a second terminal tab comprises a second one of the anode lead or the cathode lead, and wherein the terminal tab and second terminal tab extend oppositely outwardly of the pouch-type battery case.

Preferably, the battery cell has lithium-polymer based chemistry.

Preferably, the pouch-type battery comprises a plurality of pouch-type battery cases, each accommodating a battery cell interconnected to form a power tool battery.

In a second particular aspect of the invention there is provided a lithium-polymer battery powered tool comprising the pouch-type battery.

In a third particular aspect of the invention there is provided a method of manufacturing a power tool battery, the method comprising providing a pouch having a first and second sheets, sealing the first and second sheets along at least two walls to define a cell space between said sheets, disposing a battery cell within the cell space, the battery cell having a terminal tab extending outwardly of the cell space, wherein sealing the first and second sheets along at least two walls comprises, sealing at least a first wall portion with a first sealing strength, and sealing at least a second wall portion with a second sealing strength that is less than the first sealing strength such that the second sealing portion is adapted to fail before the first sealing portion, and providing an electrical contact located with the second sealing portion and adapted to change contact state upon failure of the second sealing portion.

Preferably, the second sealing portion seals the pouch-type battery case and the terminal tab, the terminal tab forming at least one part of the electrical contact.

Preferably, the electrical contact comprises a contact tab in electrical contact with the terminal tab and adapted to separate from the terminal tab upon failure of the second sealing portion.

Preferably, the battery has a nominal charged internal impedance of less than or equal to approximately 10 milliohms.

Preferably, the battery has a nominal charged internal impedance of less than or equal to approximately 5 milliohms.

Preferably, the battery has a capacity of greater than or equal to 2 Ah.

Preferably, the battery has an output voltage of at least 4 volts and a combined average discharge current of greater than 10 amps.

Further aspects of the invention will become apparent from the following description which is given by way of example only to illustrate the invention.

DESCRIPTION OF THE DRAWINGS

Various embodiments of the invention will now be described, by way of example only, with reference to the accompanying drawings in which.

DETAILED DESCRIPTION OF PREFERRED EMBODIMENTS OF THE INVENTION

The following description is given by way of example only to illustrate embodiments of the invention. The terminology used is for illustrative purpose only and is not intended to limit the scope or use of the invention, unless the text clearly and explicitly requires otherwise. A skilled person will appreciate that the invention is applicable to pouch-type battery cells generally. Where in the description reference is made to lithium ion or to lithium-polymer battery cells such reference shall be interpreted as referring to both lithium ion and lithium-polymer battery cells, or to pouch-type cells generally unless the context clearly requires otherwise.

The inventors have filed a PCT application number PCT/CN2014/080868 on 26 Jun. 2014 relating to two or more pouch-type battery cells strung together to form a battery pack, a tool battery and a battery operated tool. The entire contents of PCT/CN2014/080868 filed 26 Jun. 2014 are incorporated herein by reference and are reproduced below.

Figure 1:
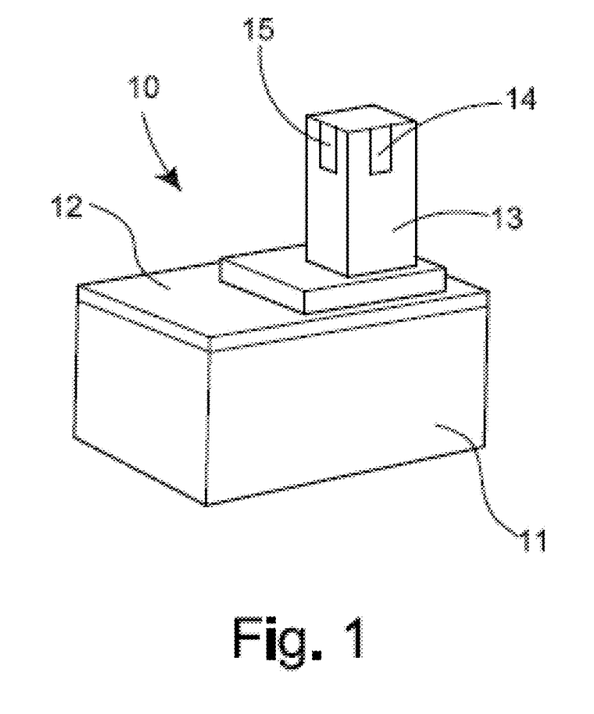
FIG. 1 illustrates a power tool battery.
Figure 2:
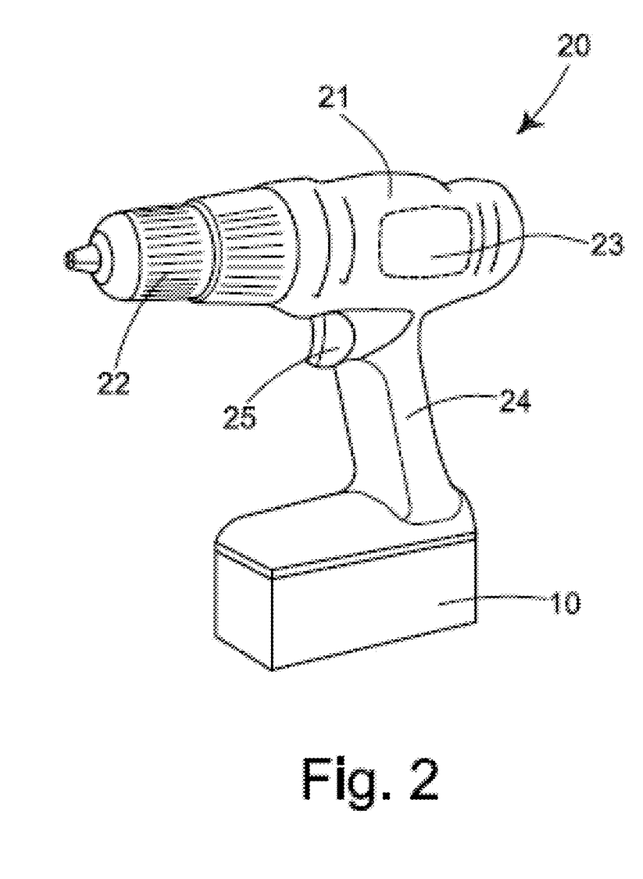
FIG. 2 illustrates a cordless power tool.

FIGS. 1 and 2 illustrate a typical tool battery 10 and a cordless (battery power) tool 20. The illustrated tool 20 is a drill or driver having a tool housing 21 and a pistol type handle 24. A motor 23 (indicated by broken lines) is located within the housing for driving a tool output 22. A battery 10 is connectable to a supported by the tool handle 24. A tool controller such as a trigger 25 is located adjacent the junction between the housing 21 and handle 24 for coupling energy from the battery 10 to the motor 23. This is, however, not intended to limit the scope of use of a battery according to the invention. Such a battery could be used in other types of cordless tools and in particular in hand-held cordless tools or in cordless lawn and garden equipment such as lawn mowers, hedge trimmers and the like. Such a battery could also be used in floor care products such as vacuum cleaners, hand-vacs and cordless sweepers.

A preferred embodiment of a battery for such types of cordless tools has a battery pack housing 11 have a mating face 12 for connecting to the tool. The battery housing 11 is selectively receivable with and supportable by the tool housing via battery connection features, and may be selectively separated from the tool for charging in a separate charger (not shown). One typical embodiment of battery mating features is illustrated in FIG. 1. In the illustrated embodiment the battery connection features are a terminal post 13 and battery terminals 14, 15 on the post 13 for connecting the battery energy sources with the tool controller or trigger 25. In alternative embodiments the battery connection features may be slide-type connection features or any other type of battery connection features known in the art. The type of battery connection features in not an essential feature of the invention.

Figure 3:
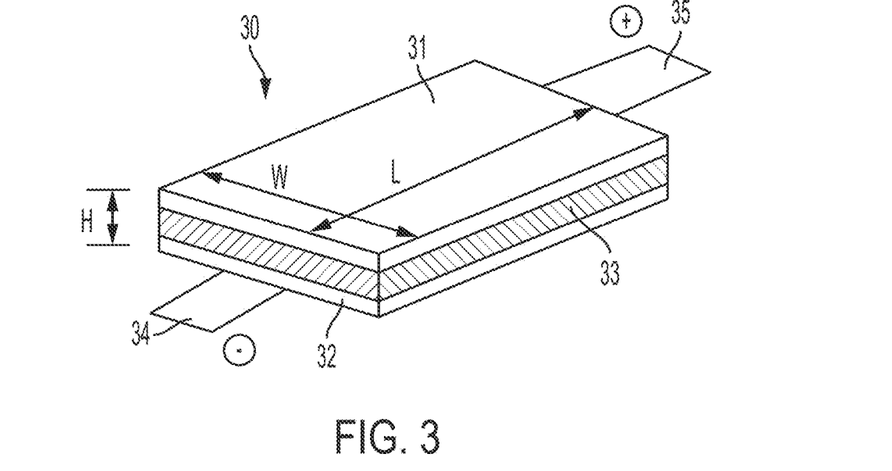
FIG. 3 illustrates a lithium-polymer based battery cell according to the invention.
Figure 4:
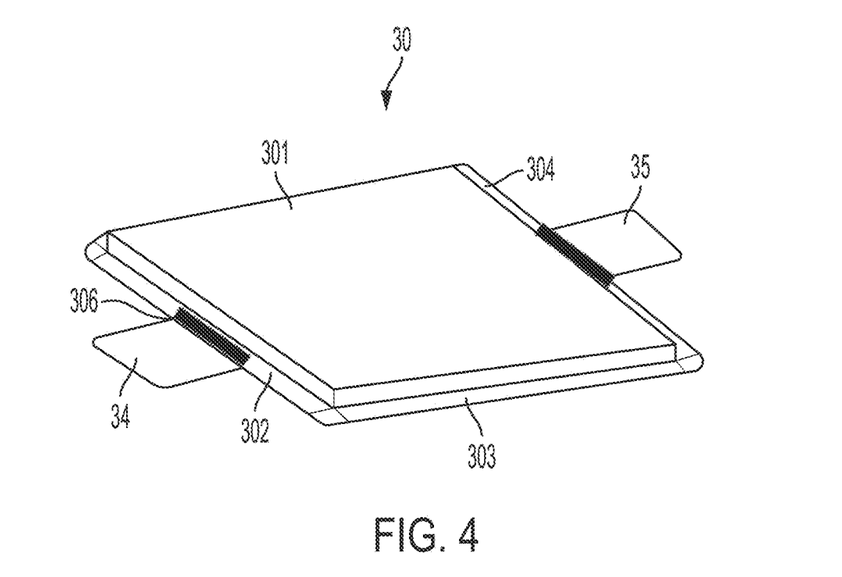
FIG. 4 illustrates a cell pouch for a lithium-polymer based battery.

FIGS. 3 to 15 show details of a battery 40 for location within the battery pack housing 11. The battery 40 comprises a plurality of substantially flat lithium-polymer battery cells 30. FIGS. 3 and 4 illustrate a typical pouch type battery for location within the tool battery pack housing 11. Each lithium-polymer cell 30 comprises a first electrode 31 and a second electrode 32 laminated to respective sides of a polymer based separator substrate 33. Connection tabs/tapes 34 and 35 are connected to the respective first and second electrodes 31, 32. The first and second electrodes 31, 32 may be any of the lithium-polymer cell anode and cathode combinations known in the art. The polymer separator 33 may be a dry solid polymer electrolyte or porous or microporous polymer substrate holding a lithium based electrolyte. The particular anode, cathode and lithium-polymer separator chemistry of the cell is chosen to provide a nominal charged internal cell impedance of less than or equal to approximately 10 milliohms. Each cell 30 may have a typical nominal cell voltage of between 2 volts and 4.2 volt and a nominal amp-hour capacity of greater than 1.5 amp-hours. Each cell is preferably, although not exclusively, enclosed in a flexible and lightweight pouch 301. The pouch 301 is formed from, for example, an Aluminum laminate film that is folded around the cell 30 to form upper and lower sheets defining a cell space and sealed along the three adjoining sides 302, 303, 304. The connection tabs/tapes 34 and 35 protrude from the pouch between the opposite sealed edges 302, 305 of the pouch.

Figure 7:
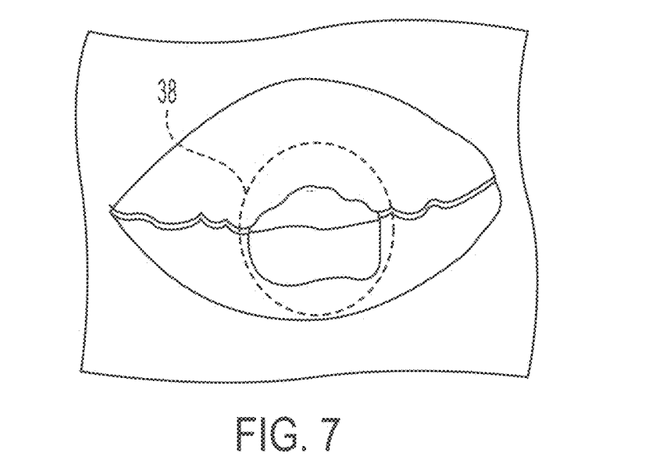
FIG. 7 illustrates venting failure of the pouch wall.
Figure 8:
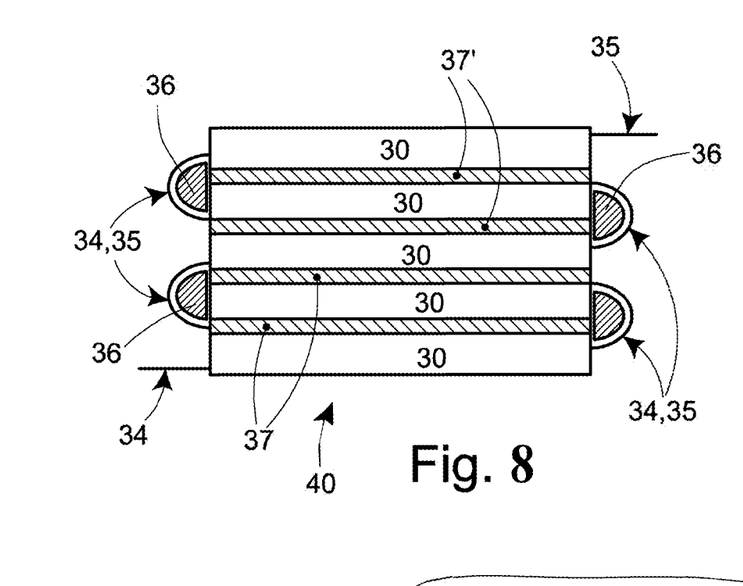
FIG. 8 illustrates a string of the five battery cells having terminals welded in series prior to forming into a stack of FIG. 9.

The battery cell is used in a battery that is associated with a battery, tool or charger machine control unit (MCU), or other battery monitoring or protection electronics. To enable the MCU to determine when the pouch-type battery cell has vented due to gas generation during charge and discharge the wall 303, 304 and 305 have a first sealing portion having a first sealing strength, and a second sealing portion 306 that has a second sealing strength that is less than the first sealing strength such that the second sealing portion is adapted to fail before said first sealing portion. FIG. 7 illustrates venting failure 38 of the pouch wall at the position of the second sealing portion 306.

Figure 5:
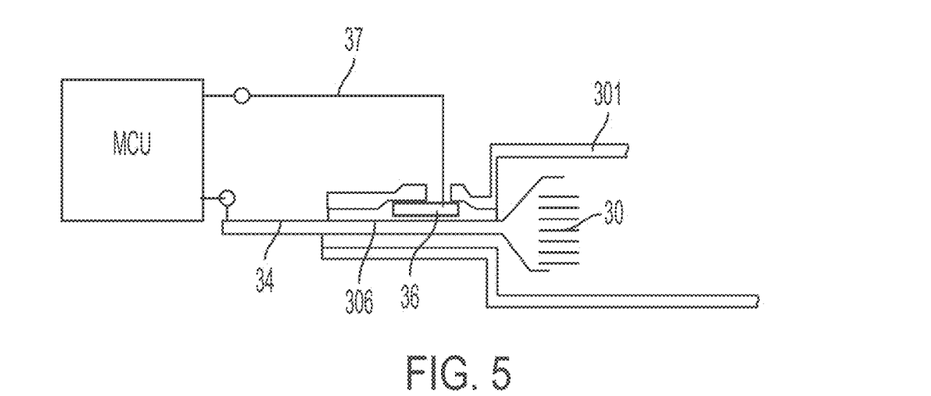
FIG. 5 illustrates a cross section though a second sealing portion of a pouch wall.
Figure 6:
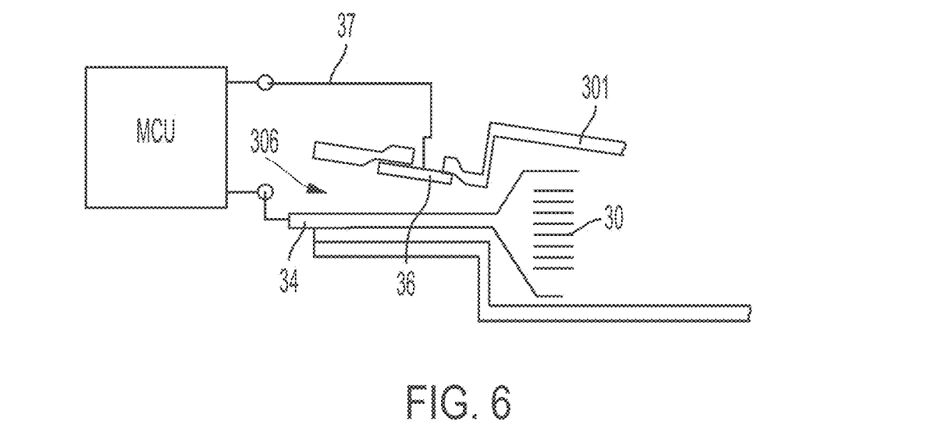
FIG. 6 illustrates a cross section though the second sealing portion of a pouch wall, in which the wall seal has failed due to venting.

In a preferred embodiment the second sealing portion 306 seals one of the terminal tabs 34 where it passes through the pouch wall 302. An electrical contact tab 36 is located at the edge of one of the sheet walls at the position of the second sealing portion 306 such that when the pouch sheets are sealed with the terminal tab 34 at the second sealing position the contact tab 36 is in electrical contact with the terminal tab 34. A lead wire 37 is provided with the contact tab 36 such that it can be connected with an MCU, or other electrical circuit, to determine the resistance of the circuit though the contact tab 36 and terminal tab 34. If the pouch 301 vents at the second sealing position the contact state changes and is sensed by the MCU or electrical circuit. It may be the case that a small venting does not completely rupture the wall sealing at the second position 306. Accordingly, a scheme is implemented where in the normal state the contact has a resistance below a threshold, say 10-ohm, and where the resistance rises above the threshold, or a second higher threshold of say 20-ohms, the MCU or electrical circuit interprets the rise as a venting of the pouch 301. Upon venting of the pouch the MCU or electrical protection circuit can take a preventative action such as, for example, shutting down of the battery, or tool or charger as may be in use with the battery at the time. Although in the preferred embodiment the contact includes the terminal tab 34, in some embodiments there may be a separate contact set in the second sealing portion not involving the terminal tab 34.

Typical sealing strengths for a pouch-type cell might be in a range of 8 kgf (kilogram-force) to 12 kgf In case one a side wall, say 303, is provided with a sealing strength of greater than 12 kgf as opposed to a nominal 9 kgf in the anode or cathode walls 302, 305. Accordingly the pouch can be made to fail in the anode or cathode walls 302, 305 as required. The sealing strength is controlled via the adhesive strength and thickness of the sealing.

In a further embodiment of the invention the sealing strength along any one of the sides 302, 303, 304 may vary. For example, in such an embodiment side 303 is provided with a first and highest sealing strength. The sealed ends 302, 304 are provided with a third sealing portion having a third sealing strength that is less than the first sealing strength. The second sealing portion 306 has a second sealing strength that is less than the first and third sealing strengths such that the second sealing portion is adapted to fail before said first and third sealing portions. A skilled person will appreciate also that the lowest sealing strength may be located at any position on the sealed sides 302, 303, 304 such that the pouch will fail at that lowest sealing strength location first so that, in combination with some indicator means, a cell rupture signal can be provided to the cell or a tool control means.

A pouch-type battery cell or a power tool battery of the present invention may also incorporate any of the features set forth in PCT/CN2014/080868 filed 26 Jun. 2014 and incorporated herein, including but not limited to a nominal charged internal impedance of less than or equal to approximately 10 milliohms, or more preferably 5 milliohms, and/or a capacity of greater than or equal to 2 Ah, and/or an output voltage of at least 4 volts and a combined average discharge current of greater than 10 amps. Disclosed material set forth in PCT/CN2014/080868 is reproduced below in this continuation application.

As disclosed in PCT/CN2014/080868, a substantially flat cell 30 according the invention has a cell length L, cell width W and cell height or thickness H. In the preferred embodiment the cell thickness H is less than 10% of the cell width W. This provides a substantially flat lithium-polymer cell which can be stacked in interconnected groups, as illustrated in FIGS. 8 to 14 for example, to form a tool battery.

For use a tool battery a plurality of the stacked battery cells 30 should have a combined output voltage of at least 4 volts and as high as 40 volts or more. Tool batteries are typically available in stepped voltages of, for example, 4, 9, 12, 18, and as high as 40 volts for some lawn and garden type tools such as lawn mowers. In order to provide sufficient torque in the tool motor the combine average discharge current provide by the plurality of battery cells 30 should be greater than 10 amps, but more preferably 20 amps, although different tools and tool motors will produce different average battery discharge currents.

The tabs 34, 35 from respective ones of the stacked plurality of battery cells 30 are connect together in series and/or parallel in order to provide the required average discharge current and combine output voltage of the battery 40. The connection between the respectively terminal tabs 34, 35 of adjacent cells 30 must be of a lower resistance than the internal resistance of the cells 30 and preferably of a very low resistance so as to prevent heating in the interconnection joint between the cells 30.

It is typical in battery manufacturing to interconnect adjacent battery cells by welding respective cell tabs at a weld joint 38. In the preferred embodiment of the invention each battery cell 30 has its respectively pair of tabs 34, 35 on different edges of the cell 30 and preferably on symmetrically opposite edges of the cell 30. This arrangement allows the plurality of cells to be easily interconnected in a string of cells 30 by jointing respective tabs 34, 35 of adjacent cells 30 with a weld joint 38. As the terminal tabs 34, 35 of the cells extend from opposite ends of the cell 30 the weld joint can be quickly and easily formed by a weld between adjacent cells 30 without potential for bridging or shorting adjacent terminal tabs of the same cell which in prior art battery designs may be along a same edge of the cell.

Figure 9:
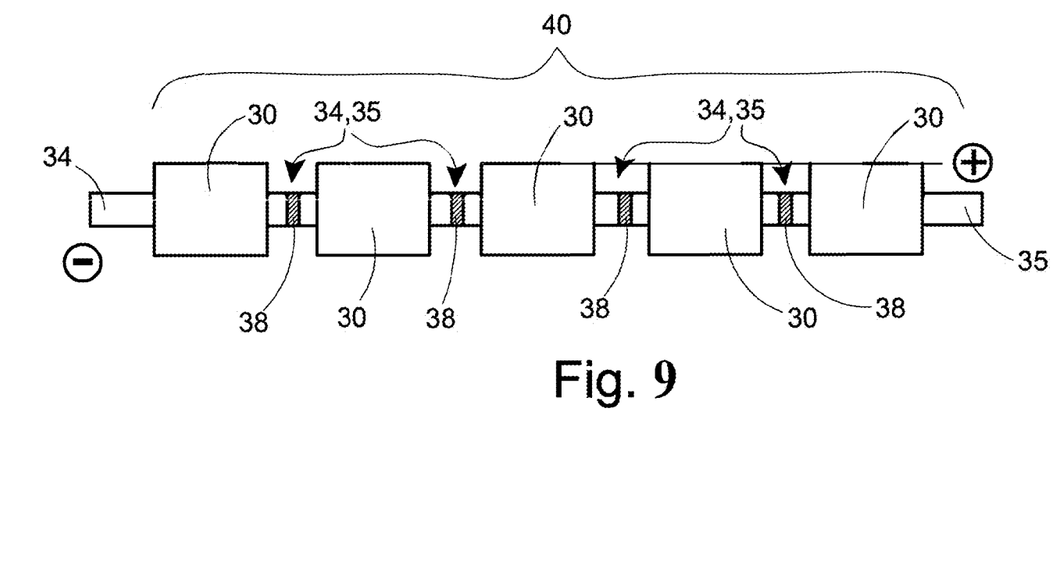
FIG. 9 illustrates a stack of five interconnected lithium-polymer based battery cells forming a tool battery according to the invention.

After electrical interconnection of the cell tabs 34, 35 the interconnected cells 30 are formed into a vertical stack of cells 30 as shown in FIG. 9, for example. In a vertical stack of cells each cell 30 is lying over or under an adjacent one of the cells 30. Although in the illustrated embodiment the cells are stacked vertically with reference to the horizontal plane this is for illustrative and descriptive purposes only and the stack of individual cell 30 may be stacked with each cell lying in a vertical, or any other, plane where each cell 30 is layered with an adjacent one of the cells 30. For the purpose of describing the invention, stacked means each cell lying in adjacent parallel planes.

During charge and discharges cycles of the battery, the thickness H of each cell 30 may very normally by up to 5% of the cell thickness H. In order to accommodate this variation in cell thickness during charge and discharges cycles the cell stack includes a resiliently deformable substrate 37 interposed between each adjacent battery cell 30. The thickness of the resiliently deformable substrates 37, and thus the distance between adjacent cells, is preferably between 5% and 10% of the normal cell thickness H in order to accommodate for variation in individual cell thickness up to 5%. In some embodiments the resiliently deformable substrate 37 between cells 30 may be provided with a thermally conductive characteristic for conducting heat away from the cells during charge and discharge cycles. For example, the substrate may be resiliently deformable and thermally conductive, or the substrate may be porous, such as a spongy material, and impregnated with a thermally conductive substance.

The cell interconnection tabs 34, 35 extended between adjacent stacked cells 30. To support and protect the interconnection tabs 34, 35 from mechanical damage in some embodiments of the invention a guide member 36 is provided at respective locations adjacent the edge of the stacked cells 30 to abut the interconnected tabs 34, 35 between adjacent cells 30. The guide member 36 has a convex guiding surface that abuts the joined tabs 34, 35 extending between the adjacent cells and supports the joined tabs about a smooth radius between the adjacent cells 30.

The interconnected stack of cells 30 forming battery 40 is located within a battery pack housing such as housing 11 of the battery of FIG. 1. It will be appreciated by a skilled person that the battery 40 constructed of pouch cells must be physically and mechanically supported within the battery housing 11 against mechanical vibrations and shocks that might be experienced during use of the tool to which a battery pack 10 is connected. FIGS. 9 to 13 show a cradle and shell arrangement for mechanically supporting a stack of battery cells 30 within the battery housing 11 in some embodiments.

Figure 10:
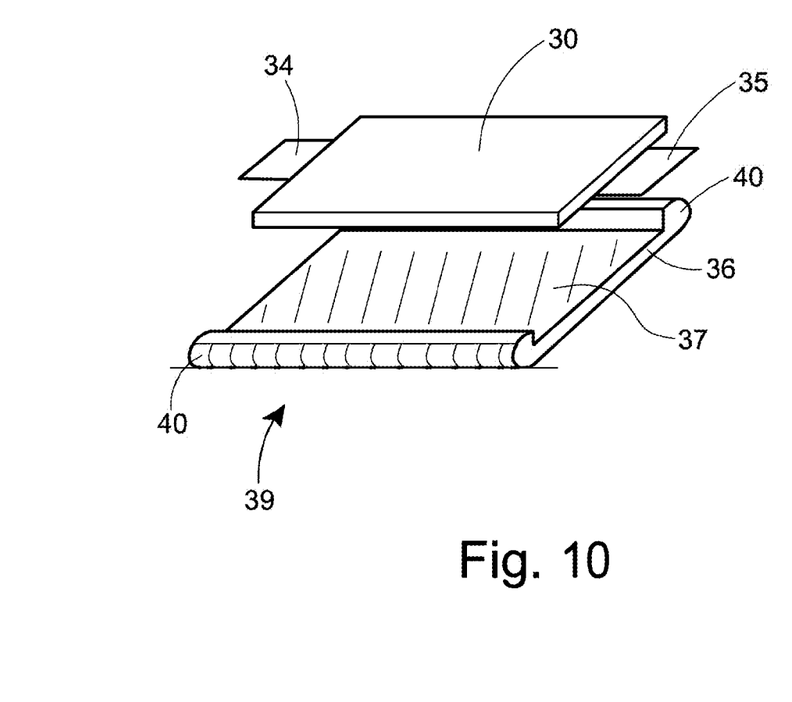
FIG. 10 illustrates a battery cell according to the invention and a resiliently deformable cradle for the battery cell.
Figure 11:
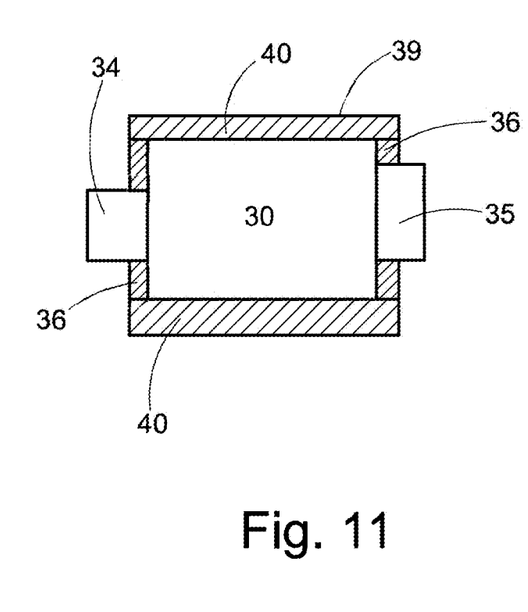
FIG. 11 illustrates a second view of the battery cell and cradle.

FIG. 10 shows an individual battery cradle 39 for supporting a substantially flat lithium-polymer battery cell 30. The cradle 39 is a flat substrate of resiliently deformable material such as EVA foam or the like and has a wide cell-channel extending through one face of the substrate. An individual battery cell 30 locates within the cell-channel for support by the cradle. The cradle 39 has side edges 40 to provide mechanical protection for the sides of the battery cell 30 and integrally combines the resiliently deformable cell spacer substrate 37, below the cell-channel, and cell tab guide 36 into a single protective cradle for an individual battery cell 30.

Figure 12:
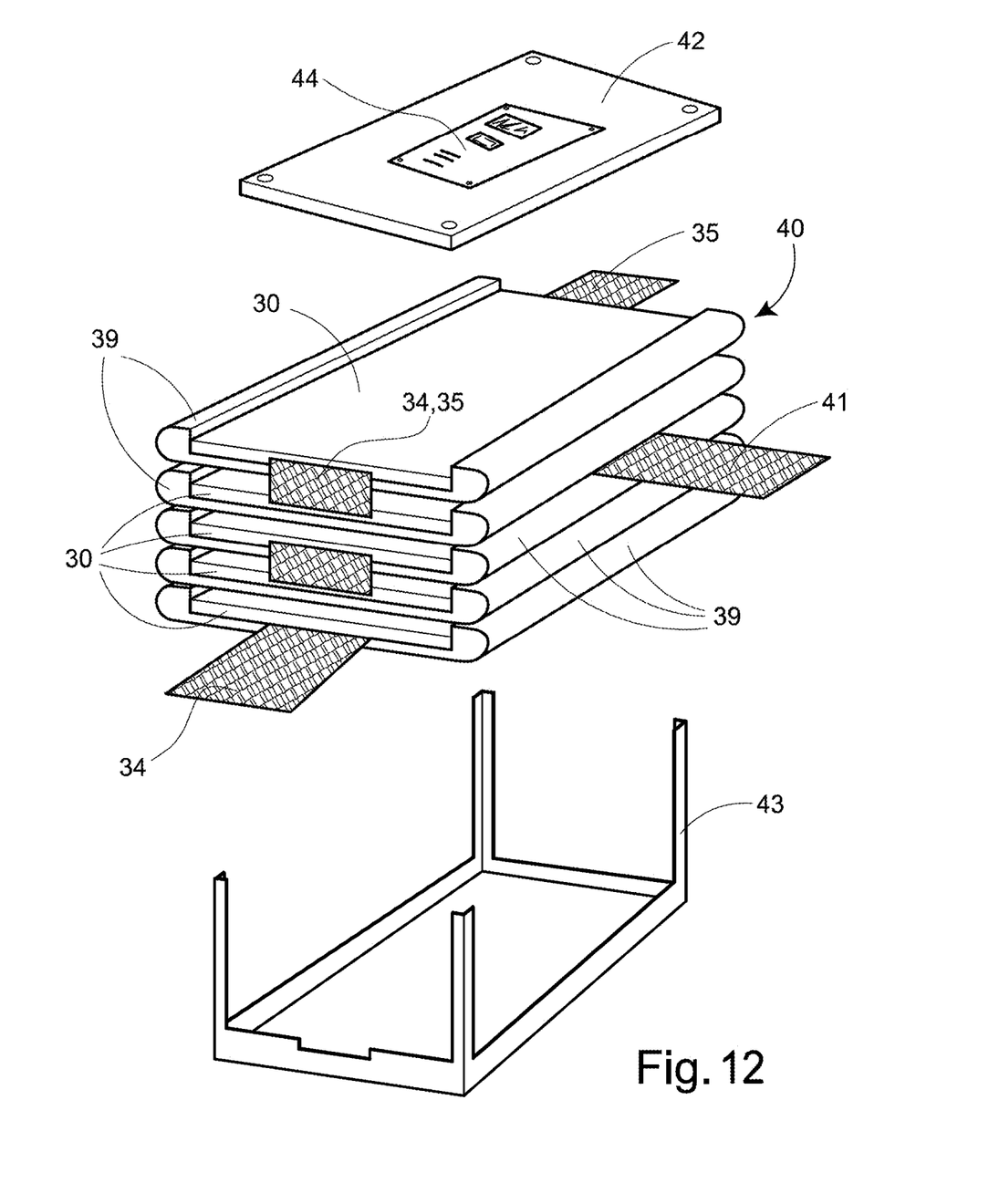
FIG. 12 illustrates an explored view of a battery comprising a polarity of lithium-polymer battery cells.

FIG. 12 shows a stack of battery cells 30 each held within its own individual resiliently deformable cradle 39. The cradled stack of battery cell 30 locates within a cradle frame 43 and is fitted with a cover 42 in order to mechanically hold the stack of battery cells 30 together. A printed circuit board assembly (PCBA) 44 can optionally be attached to or incorporated with the cover 42. The PCBA can contain battery pack electronics and protection circuits. The cradle frame 43 supporting the battery 40 is located within a battery housing 11. The cradles 39 and cradle frame 42, 43 are preferably a "friction fit" within the battery housing 11 such that the battery 40 is mechanically supported against and variations and shocks experienced during use of the battery on a power tool.

Figure 13:
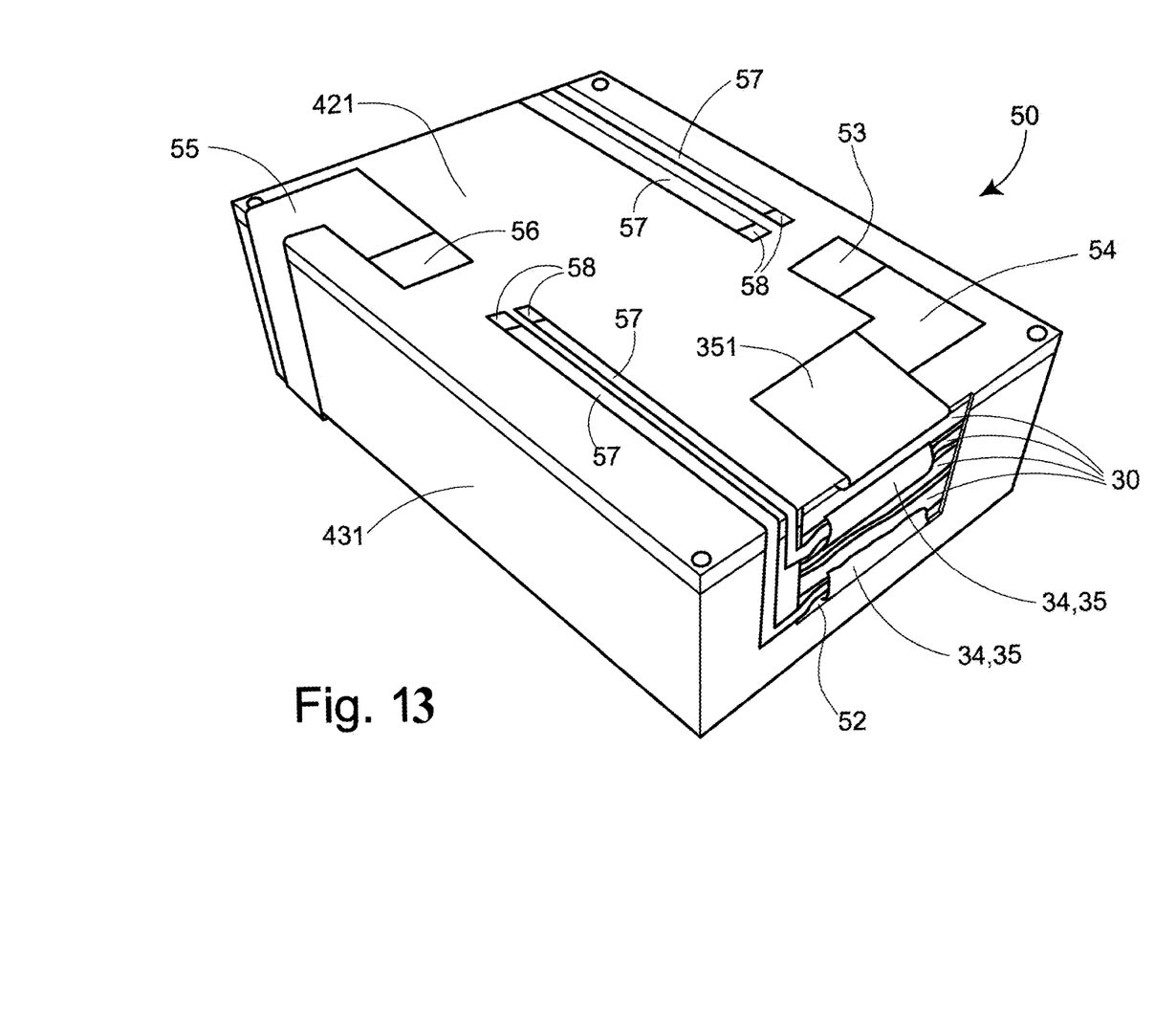
FIG. 13 illustrates a first perspective view of a battery case for a lithium-polymer based battery according to the invention.
Figure 14:
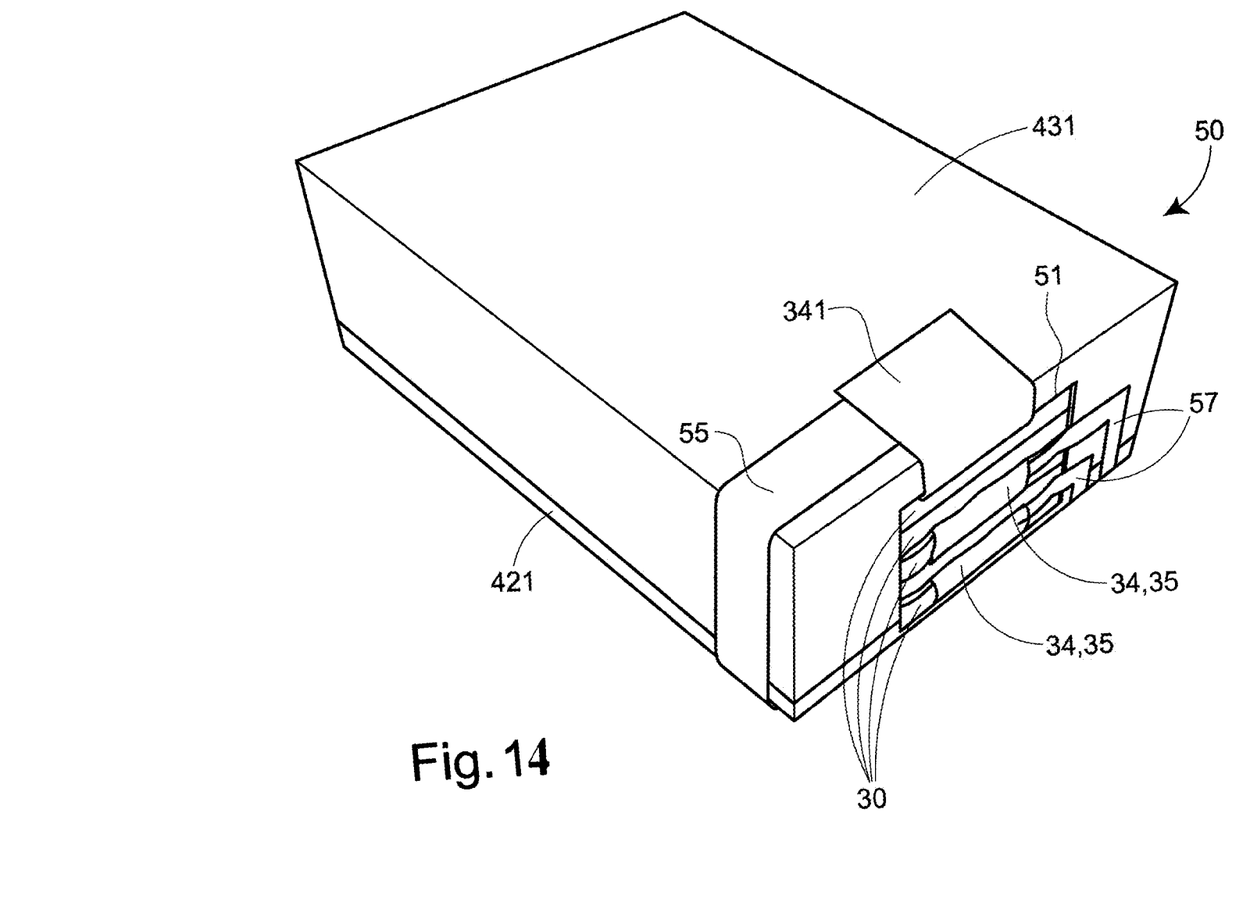
FIG. 14 illustrates a second perspective view of the battery case for a lithium-polymer based battery according to the invention.
Figure 15:
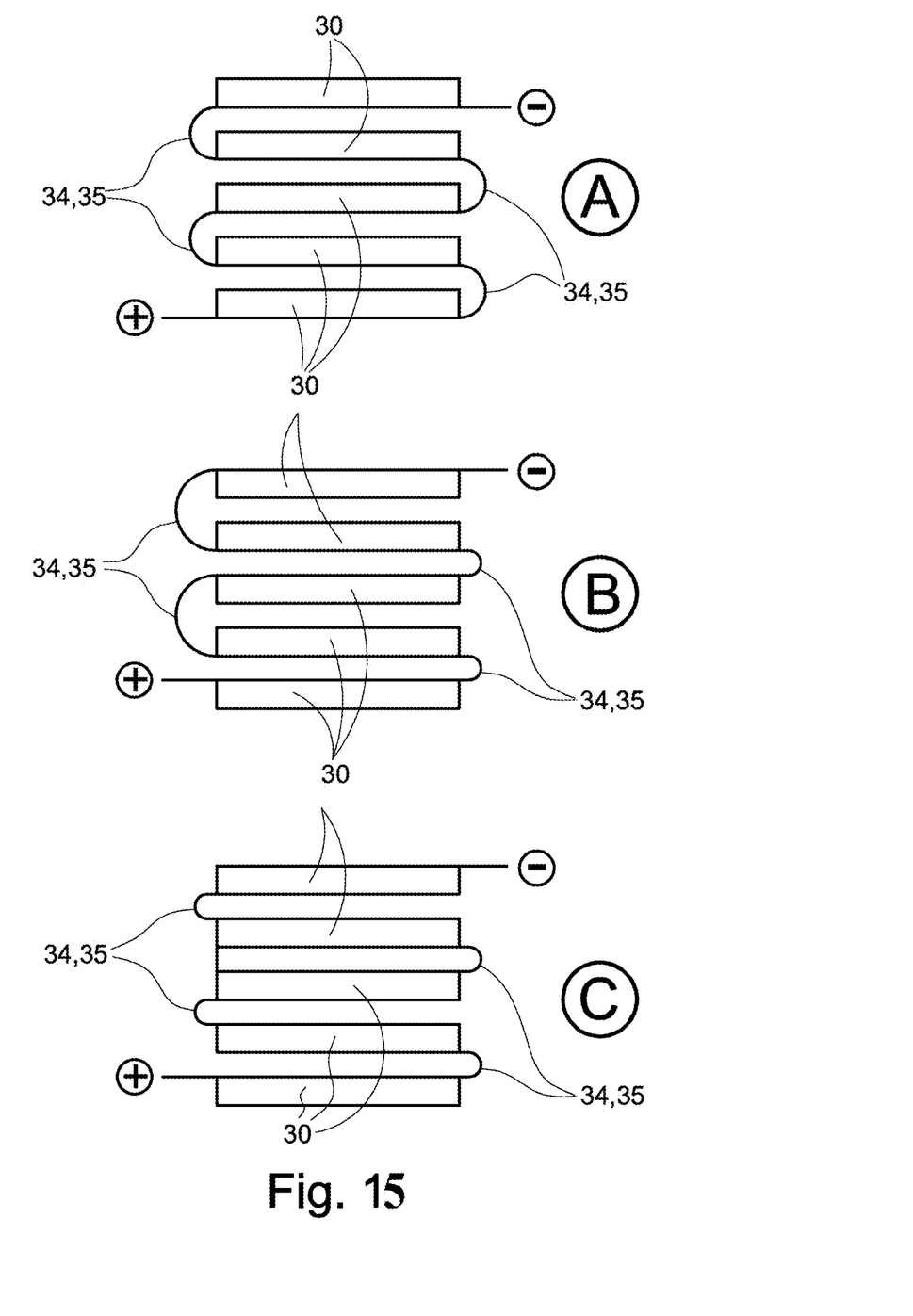
FIG. 15 illustrates different connection arrangements for a stack of lithium-polymer battery cells.

In some embodiments further mechanical protection of the pouch cell battery is provided by enclosing the stack of battery cells 30 within a shell or case 50 as shown in FIGS. 13 and 14. The case 50 comprises a case enclosure 431 having a base and four surrounding side walls defining a cavity into which the stacked battery cells 30 are located. A cover 421 is fixed to the tops of the four surrounding side walls to enclose the cavity and stacked battery cells 30. An opening 51, 52 is provided in each of the opposed end side walls of the case enclosure 431 to allow space for and accommodate connection access to the interconnected terminal tabs 34, 35 of adjacent cells 30.

The free end terminal tabs 341 and 251 of the stack of cells 30 pass though respective end openings 51, 52 and are folded through substantially 180-degrees to lie substantially flat with respective upper and lower surfaces of the case 50. The first free terminal tab 351 of the stacked cells 30 is folded back against a first surface of the case 50 and electrically connected with one end of a conductive lead strap 54. The second end of the first conductive lead strap 54 has a first exposed connection terminal 53 of copper or other electrically conductive terminal material. The conductive lead strap 54 is preferably a copper strap having an insulated coating such as a polyurethane insulating varnish. The terminal end 53 of the strap is free of the insulating varnish to allow for electrical connection to the strap.

The second free terminal tab 341 of the stacked cells 30 is folded back against the second opposite surface of the case 50 and electrically connected with one end of a second conductive lead strap 55. The second conductive lead strap 55 extends flat with the case surface around the side of the case to the first surface of the case 50 where it is provided with a second exposed connection terminal 56 of copper of other electrically conductive terminal material. The second conductive lead strap 55 is preferably a copper strap having an insulated coating such as a polyurethane insulating varnish. The terminal end 56 of the strap is free of the insulating varnish to allow for electrical connection to the strap.

In some embodiments auxiliary conductive straps 57 of a type the same or similar to first and second conductive straps 54, 55 are provided for providing addition signal connections to the stack of cells 30. For example, auxiliary conductive straps 57 are preferably provided for each of the interconnected terminal tabs 34, 35 between stacked cells for providing means for measuring individual cell voltages. Each auxiliary conductive strap 57 has a connection terminal 58 at its distal end. Auxiliary conductive straps 57 may also be provided to temperature and other sensors associated with the stack of cells 30. A printed circuit board assembly (PCBA) can optionally be attached to or incorporated with the enclosure cover 421 or within the case 50. The PCBA can contain battery pack electronics and protection circuits.

Within some embodiment a small PCBA is attached to the tabs 34, 35 of the battery cells. Such a PCBA can comprises a sensor for transmitting a voltage dependent sensor signal to the battery controller 44, or a battery charger controller for determining cell voltages for using in, for example, cell balancing operations. In a further embodiment of the invention one or more sensor elements can be located between adjacent cells for measuring temperature and other cell characteristics. In one embodiment a pressure sensor is provided between adjacent cells for detecting expansion in cell thickness during charge and discharge cycles. If pressure or deformation of the substrate between adjacent cells exceeds a threshold this may indicate an abnormal and possibly dangerous cell condition. Signals from such sensors are transmitted to the battery controller 44, or a battery charger controller.

Traditional lithium ion cells used in tool batteries are mechanically contained in a strong cylindrical metal can. These cans are grouped together to form a battery and located in a battery pack housing. The interior of the housing has a first housing volume and the grouped cell cans defines a combined battery volume. The fill-factor of a cylindrical body in a substantially square or rectangular housing is at best Pi divided by 4 ($\Pi/4$) or 78%. The stacked flat cells of the present invention provides a ratio of the combined battery volume to housing volume (fill ration) of greater than 80%, allowing for a smaller more light weight battery.

In the various embodiments described above the battery comprises a plurality of interconnected cells. In at least one alternative embodiment the battery may comprises just one lithium polymer based chemistry cell. In other alternative embodiment the battery may comprises between 2 and 20 interconnected cells, or more preferably between 2 and 10 interconnected cells. In yet another embodiment the battery may comprises between 3 and 5 cells interconnected in series. In the various embodiments the cells may be interconnected in series, in parallel, or groups of series cells may be interconnected in parallel in order to obtain a desired output voltage and combined average discharge current.

We claim:

1. A battery pack for powering a hand held power tool or a garden tool, the battery pack comprising:

a housing selectively connectable to and supportable by a hand held power tool or a garden tool; and a pouch-type battery including
- a pouch-type battery case located within the housing and having a joined wall and a cell space within the pouch-type battery case,
- a battery cell within the cell space,
- a terminal tab extending outwardly of the cell space from the battery cell,
- said joined wall comprising at least a first sealing portion having a first sealing strength, and a second sealing portion having a second sealing strength that is less than the first sealing strength such that the second sealing portion is configured to fail before said first sealing portion, and
- an electrical contact located with the second sealing portion and configured to change contact state upon failure of the second sealing portion;
- wherein the second sealing portion seals the pouch-type battery case and the terminal tab, the terminal tab forming at least one part of the electrical contact.

2. The battery pack of claim 1, wherein the battery cell has an output voltage of at least 4 volts and produces an average discharge current of greater than 10 amps.

3. The battery pack of claim 1, wherein the battery cell has a lithium-polymer based chemistry and a nominal charged internal impedance of less than or equal to approximately 10 milliohms.

4. The battery pack of claim 1, further comprising a plurality of the pouch-type batteries located within the housing, the plurality of pouch-type batteries being interconnected to have a combined output voltage of at least 4 volts and a combined average discharge current of greater than 10 amps, wherein each pouch-type battery has a lithium-polymer based chemistry and a nominal charged internal impedance of less than or equal to approximately 10 milliohms.

5. The battery pack of claim 4, wherein the plurality of pouch-type batteries have a combined output voltage of between 4 volts and 40 volts.

6. The battery pack of claim 4, wherein the plurality of pouch-type batteries are layered within the housing such that each pouch-type battery is lying adjacent another one of the pouch-type batteries, and further including a resiliently deformable substrate between the adjacent pouch-type batteries;
- wherein the battery cell is generally flat and has a cell width and a cell thickness, the cell thickness being less than 15% of the cell width;
- wherein a distance between the adjacent pouch-type batteries is greater than 5% of the cell width; and
- wherein the resiliently deformable substrate is thermally conductive or contains a thermally conductive component.

7. The battery pack of claim 6, further comprising at least one sensor element located between at least two adjacent ones of the pouch-type battery, said at least one sensor element configured to provide a first sensor signal to a battery controller; and
- wherein the at least one sensor element includes a temperature sensor and a second sensor element located between at least two adjacent ones of the pouch-type batteries, the second sensor element configured to provide a pressure sensor signal to the battery controller.

8. The battery pack of claim 4, wherein the housing defines a housing volume and the plurality of pouch-type batteries provides a combined battery volume, and wherein a ratio of the combined battery volume to the housing volume is greater than 80%.

9. The battery pack of claim 4, wherein the terminal tab of each of the pouch-type batteries is a first terminal tab connected with one of an anode sheet and a cathode sheet of the pouch-type battery;
- wherein each of the pouch-type batteries includes a second terminal tab connected with the other one of the anode sheet and the cathode sheet of the pouch-type battery; and
- wherein the first terminal tab extends from a first edge of the pouch-type battery and the second terminal tab extends from a second edge of the pouch-type battery, the second edge being a different edge than the first edge of the pouch-type battery.

10. The battery pack of claim 4, wherein the plurality of pouch-type batteries is supported within the housing in a resiliently deformable cradle surrounding at least a part of each pouch-type battery.

11. The battery pack of claim 1, wherein the battery cell has a nominal amp-hour capacity of greater than 1.5 amp-hours.

12. The battery pack of claim 1, wherein the battery cell has a nominal cell voltage of between 2 volts and 4.2 volts.

13. The battery pack of claim 1, wherein the battery cell comprises an anode electrode sheet, a cathode electrode sheet, and a lithium-polymer based substrate laminated between the anode and cathode electrode sheets.

14. The battery pack of claim 1, wherein the electrical contact is connected to an electrical control circuit configured to sense a change in the contact state.

15. The battery pack of claim 1, wherein the electrical contact comprises a contact tab in electrical contact with the terminal tab, the contact tab configured to separate from the terminal tab upon failure of the second sealing portion.

16. A tool battery comprising:
- a housing selectively connectable to and supportable by a hand held power tool or a garden tool; and
- a plurality of pouch-type batteries stacked within the housing such that each pouch-type battery is layered over or under an adjacent pouch-type battery and a resiliently deformable substrate located between adjacent pouch-type batteries;
- wherein each pouch-type battery includes
  - a pouch-type battery case located within the housing and having a joined wall and a cell space within the pouch-type battery case,
  - a battery cell within the cell space,
  - a terminal tab extending outwardly of the cell space from the battery cell,
  - said joined wall comprising at least a first sealing portion having a first sealing strength, and a second sealing portion having a second sealing strength that is less than the first sealing strength such that the second sealing portion is configured to fail before said first sealing portion, and
  - an electrical contact located with the second sealing portion and configured to change contact state upon failure of the second sealing portion, wherein the electrical contact is connected to an electrical control circuit configured to sense a change in the contact state.

17. The tool battery of claim 16, wherein each pouch-type battery has a lithium-polymer based chemistry and a nominal charged internal impedance of less than or equal to approximately 10 milliohms.

18. A battery-powered tool comprising:
a power tool housing;
an electrical motor in the power tool housing;
a motor control circuit for controlling power supplied to the motor from an electrical energy source;
a battery housing selectively connectable to and supportable by the power tool housing;
a battery within the battery housing for supplying power to the motor control circuit and the motor when the battery housing is connected with the power tool housing;
the battery including at least one pouch-type battery, wherein the at least one pouch-type battery includes
a pouch-type battery case located within the battery housing and having a joined wall and a cell space within the pouch-type battery case,
a battery cell within the cell space,
a terminal tab extending outwardly of the cell space from the battery cell,
said joined wall comprising at least a first sealing portion having a first sealing strength, and a second sealing portion having a second sealing strength that is less than the first sealing strength such that the second sealing portion is configured to fail before said first sealing portion, and
an electrical contact located with the second sealing portion and configured to change contact state upon failure of the second sealing portion.

19. The battery-powered tool of claim 18, wherein the at least one pouch-type battery has an output voltage of at least 4 volts and produces a combined average motor supply current of at least 10 amps.

20. The battery-powered tool of claim 18, wherein each battery cell has a lithium-polymer based chemistry and a nominal charged internal impedance of less than or equal to approximately 10 milliohms.

\* \* \* \* \*